Patented Jan. 23, 1934

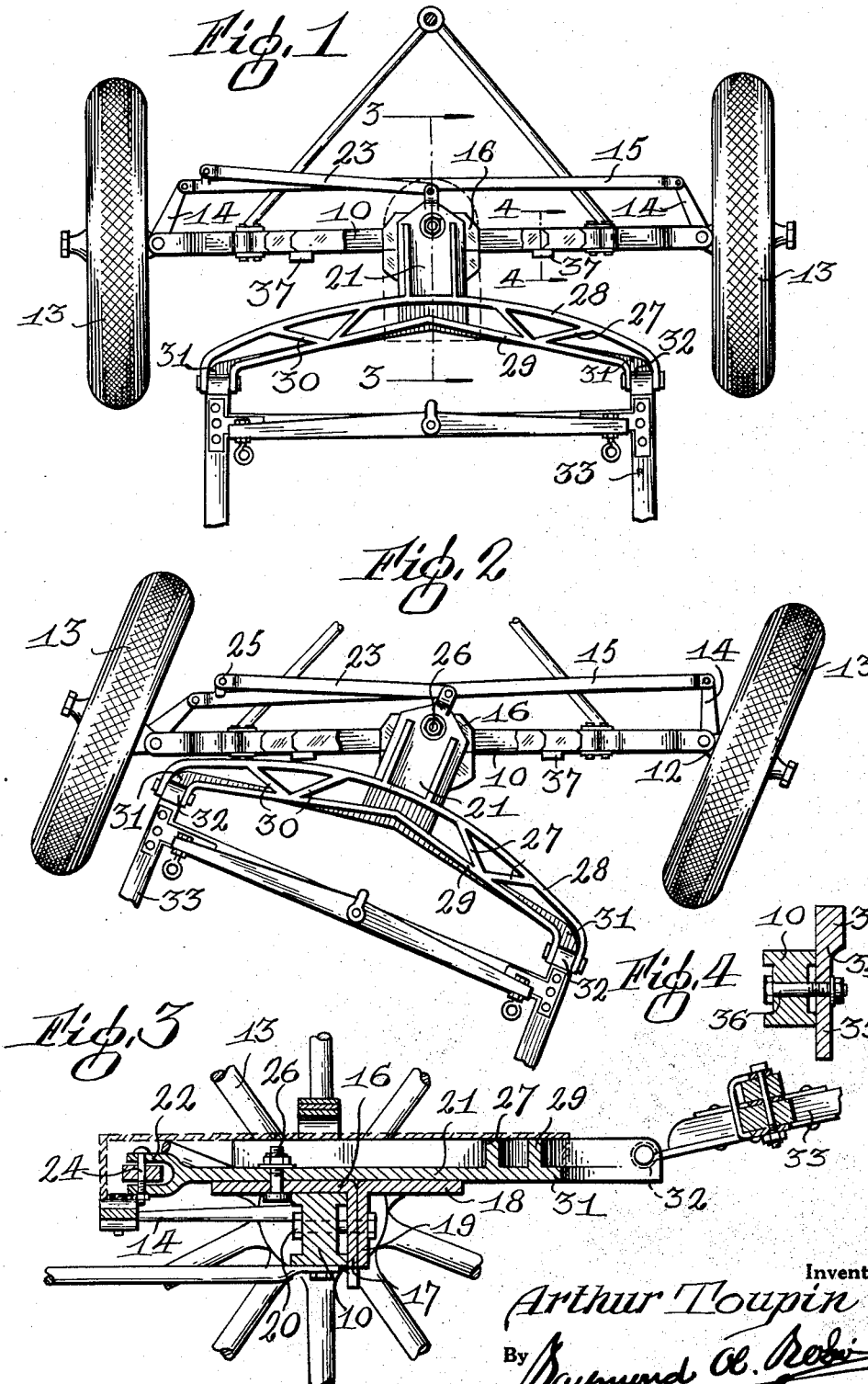

1,944,333

UNITED STATES PATENT OFFICE 1,944,333

VEHICLE STEERING GEAR

Arthur Toupin, Nicolet, Quebec, Canada

Application October 21, 1932. Serial No. 638,935

1 Claim. (Cl. 280—103)

The present invention relates to improvements in vehicle steering gears and has particular reference to steering gear for horse drawn vehicles.

An important object of the invention is the provision of a steering gear for horse drawn vehicles constructed so that the front wheels of the vehicle may be turned with a minimum of strain upon the draught animal.

A further object of the invention is the provision of steering gear of the above character designed to enable efficient steering of the vehicle.

Another object of the invention is the provision of a vehicle steering gear which is simple, durable and compact in construction and which can be manufactured at a relatively low cost.

Other objects and advantages of the invention will become apparent as the description progresses.

In the accompanying drawing forming a part of this specification and in which like reference characters are employed to designate corresponding parts throughout the same:

Figure 1 is a top plan view of the improved steering gear with the front wheels in a straight forward position, Figure 2 is a similar view showing the gear actuated to a complete turning movement in one direction, Figure 3 is an enlarged transverse section taken on the line 3—3 of Figure 1, and Figure 4 is a transverse section taken on the line 4—4 of Figure 1.

Referring to the drawing, wherein for the purpose of illustration is shown a preferred embodiment of the invention, the numeral 10 generally designates the front axle of a horse drawn vehicle provided at the ends with yokes 11.

Pivotally connected to each of the yokes 11 is a steering knuckle 12 including a spindle upon which each of the front carrier wheels 13 is rotatably mounted.

Each of the knuckles 12 also embodies a rearwardly projecting steering arm 14 having pivotally connected therewith the ends of a tie rod 15.

Mounted to lie upon the central portion of the axle 10 is a bearing plate 16 provided at one edge with a depending flange 17 disposed against the front side of the axle. Extending forwardly in a plane with the bearing plate 16 is an extension plate 18 provided at one end with a flange 19 adapted to be positioned against the front face of the flange 17. The co-extensive plates 16 and 18 are rigidly fastened in position by means of a bolt 20 extending transversely through the axle 10 and through apertures in the plates 17 and 18 to securely fasten these elements on the axle.

Rotatably positioned on the plates 16 and 17 is a rotatable steering head 21, in the present instance in the form of a flat elongated metallic plate provided at the inner end with a rearwardly projecting pivot yoke 22. A steering connecting rod 23 is disposed so that one end is pivotally connected with a pin 24 supported in the yoke 22, while the opposed end is connected with a pivot pin 25 projecting from the tie rod adjacent one end thereof. The head plate 21 is rotatably fastened on the bearing plate 16 through the medium of a bolt 26.

On the forwardly projecting end of the head 21 is formed a transversely disposed substantially arcuately shaped draught member 27 embodying an arcuately bent rear rib 28 and an angularly bent forward rib 29 arranged in spaced relation and reenforced adjacent the ends by means of angular bracing ribs 30. The draught member 27 also preferably embodies a flat angular base bar 31 extending below the forward rib 29 and arranged at right angles thereto. At the ends, the draught member 27 is formed to provide channel shaped shaft coupling sections, indicated at 32.

The thills or shafts 33, forming the draught gear, are to be pivotally connected with the coupling sections 32 at the ends of the draught member.

Attached to the front of the axle 10, at positions spaced from the center thereof, are a pair of stop pieces 34 each of which embodies a vertically disposed bar 35, rigidly connected with the axle by a bolt 36, having formed at the upper end a contact pad 37 engageable with the draught member 27 when the steering gear is actuated to its extreme movement in one direction, as shown to advantage in Figure 2.

Thus, the present construction provides a simple and efficient steering mechanism which will enable turning of the vehicle with little effort by the draught animal and which will also provide a construction which will be very durable.

It is to be understood that the form of my invention herein shown and described is to be taken as a preferred example of the same, and that various changes as to the shape, size, and arrangement of parts may be resorted to without departing from the spirit of the invention or the scope of the subjoined claim.

Having thus described my invention, I claim:—

In steering gear for animal drawn vehicles, the combination with a vehicle axle, steering knuckles pivotally connected with the ends of the axle and a tie rod connecting the arms of the knuckles rearwardly of the axle, of a steering head rotatably pivoted at the rear of the axle and comprising a short rearwardly directed extension, a rod directly connecting the extension of the head with the tie rod adjacent one end thereof, a transversely extending draught member united with the front end of the head including a rearwardly disposed arcuate rib adapted to limit the steering movement by contacting with the axle, and means at the ends of the draught member for engaging the animal draught gear.

ARTHUR TOUPIN.